United States Patent
Sarmiento

(10) Patent No.: US 10,639,815 B2
(45) Date of Patent: May 5, 2020

(54) SELF-ADJUSTING DEVICE FOR CUTTING HEAD FOR MONOGUIDE CUTTERS

(71) Applicant: GERMANS BOADA, S.A., Rubí, Barcelona (ES)

(72) Inventor: Miguel Angel Sarmiento, Barcelona (ES)

(73) Assignee: GERMANS BOADA, S.A., Rubí, Barcelona (ES)

( * ) Notice: Subject to any disclaimer, the term of this patent is extended or adjusted under 35 U.S.C. 154(b) by 0 days.

(21) Appl. No.: 16/323,858

(22) PCT Filed: Jan. 10, 2018

(86) PCT No.: PCT/ES2018/070019
§ 371 (c)(1),
(2) Date: Feb. 7, 2019

(87) PCT Pub. No.: WO2018/138394
PCT Pub. Date: Aug. 2, 2018

(65) Prior Publication Data
US 2019/0193300 A1    Jun. 27, 2019

(30) Foreign Application Priority Data
Jan. 26, 2017 (ES) .................... 201730095

(51) Int. Cl.
*B28D 1/22* (2006.01)

(52) U.S. Cl.
CPC ............. *B28D 1/228* (2013.01); *B28D 1/225* (2013.01)

(58) Field of Classification Search
CPC .......... B28D 1/005; B28D 1/225; B21D 5/04; B21D 5/042; B23D 31/002; B23D 31/00; B23D 19/02; D21D 19/04; B26D 1/04; B26D 1/245; Y10T 83/8822; Y10T 83/0348; Y10T 83/8841; Y10T 83/667
USPC ......... 83/614, 881, 627, 485, 500, 743, 745, 83/649, 455, 34, 574, 454; 72/294, 210, 72/319, 211; 30/289, 293, 292, 294, 290
See application file for complete search history.

(56) References Cited

U.S. PATENT DOCUMENTS

| | | | | |
|---|---|---|---|---|
| 4,158,315 A | * | 6/1979 | Kensrue | B23Q 1/262 173/32 |
| 4,646,439 A | * | 3/1987 | Squires | B26D 1/04 30/289 |
| 5,052,093 A | * | 10/1991 | Urlacher | B25B 27/0092 29/235 |
| 6,000,268 A | * | 12/1999 | Van Cleave | B21D 5/04 72/211 |

(Continued)

*Primary Examiner* — Ghassem Alie
(74) *Attorney, Agent, or Firm* — Hodgson Russ LLP

(57) ABSTRACT

A cutting head for monoguide cutters, with a self-adjusting device is provided. The self-adjusting device can include sets of bearings that comprise fixed bearings (31, 32) and an adjustable bearing (33) that act on races (11, 12) of a monoguide profile disposed on different planes. Each adjustable bearing (33) is mounted on a rocker arm (4) with a first end (41) rotatably mounted on a shaft (5) fixed to the cutting head (2), and with a second end (42) that presses against an elastic element (6) situated between the second end (42) of the rocker arm (4) and the case of the cutting head (2), the elastic element (6) determines the pressure of the bearings (31, 32, 33) against the races (11, 12) of the monoguide profile (1).

2 Claims, 2 Drawing Sheets

(56) References Cited

U.S. PATENT DOCUMENTS

| | | | |
|---|---|---|---|
| 6,755,067 B1* | 6/2004 | Van Cleave | B21D 5/04 72/294 |
| 2001/0037747 A1* | 11/2001 | Svensson | B60L 13/06 104/120 |

* cited by examiner

SELF-ADJUSTING DEVICE FOR CUTTING HEAD FOR MONOGUIDE CUTTERS

CROSS-REFERENCE TO RELATED APPLICATION

This application is a U.S. national phase application of International Application No. PCT/ES2018/070019, filed Jan. 10, 2018, which claims priority to P201730095, filed Jan. 26, 2017, the entire disclosures of which are incorporated herein by reference.

OBJECT OF THE INVENTION

The object of the present invention is a self-adjusting device for a cutting head for monoguide cutters which has characteristics aimed at allowing for the self-adjustment of a cutting head with respect to a monoguide profile on which it is mounted with the possibility of moving in a longitudinal direction.

FIELD OF APPLICATION OF THE INVENTION

This invention is applicable in the field of monoguide cutters and especially, although not in a limiting way, to manual ceramic cutters.

STATE OF THE ART

Ceramic cutters which have a cutting head able to move along a monoguide profile are currently known on the market.

The aforementioned head incorporates sets of bearings that move on longitudinal races defined on the guide and arranged on perpendicular planes.

Said sets of bearings comprise fixed bearings and adjustable bearings that have the function of adjusting the play of the cutting head in such a way that possible and geometric deviations and tolerances are absorbed.

The adjustment of the adjustable bearings is done by means of a screw and locknut system, such that the nut presses the bearing or mobile, arranged between two fixed bearings, against the guide for adjusting the play of the head.

This adjustment system has the following drawbacks:
  Manual adjustment that depends on the criteria and the tact of each operator.
  Difficulty in establishing the appropriate pressure of the screw.
  Difficulty in centering the cutting head on the guide, with the use of a tool being necessary for this operation.
  Fixed adjustment, that does not adapt to the dimensional variations that the guide may have along the path of the cutting head.

Thus, the problem for which a solution is necessary is the development of a device for the self-adjustment of monoguide cutters, which satisfactorily solves the aforementioned drawbacks.

DESCRIPTION OF THE INVENTION

With the aim of solving the previously mentioned problems, the self-adjusting device for monoguide cutters, object of the invention, was designed, which comprises sets of bearings included in a moveable cutting head that moves along a monoguide profile and which include fixed bearings and adjustable bearings that act on longitudinal races defined on the monoguide profile and arranged on different planes, having specific constructive features aimed at maintaining the pressure of the adjustable bearings on the guide in a constant manner, without the operator having to intervene and without requiring an adjustment system by means of clamping screw and locknut.

According to the invention, to achieve the objectives proposed, each adjustable bearing is mounted on a rocker having a first end rotatably mounted on a shaft fixed to the cutting head, and a second end that presses against an elastic element situated between said second end of the rocker and the case of the cutting head.

The pressure exerted by the elastic element is determined by the design, controlling the free space between the second end of the rocker and the case of the cutting head, and the measurement of the elastic element arranged between the same.

Furthermore, through self-regulation by means of this elastic element, the bearings of the cutting head always exert the correct pressure on the guide, regardless of whether the same has positive or negative irregularities along the path of the head.

This way play is eliminated between the guide and the cutting head and, at the same time we achieve that the sliding head has quality and precision contact.

This system provides a series of relevant advantages with respect to the screw and locknut adjustment method currently used; specifically:
  It reduces the number of components.
  It does not require manual adjustment by the operator, such that it saves time and production costs.
  It does not depend on the tact or criteria of each operator when they are adjusting the pressure.
  The cutting head is automatically centered with the guide without the need to use any tools.
  It does not require further adjustments by the user.
  It absorbs the possible dimensional variations, both the positive and negative ones, of the guide along the path of the cutting head.
  It improves the aesthetics of the cutting head by eliminating the adjustment screws previously used which projected from the same.

DESCRIPTION OF THE FIGURES

As a complement to the description being made, and for the purpose of helping to make the characteristics of the invention more readily understandable, this specification is accompanied by a set of drawings which, by way of illustration and not limitation, represent the following.

PREFERRED EMBODIMENT OF THE INVENTION

Figure 1:
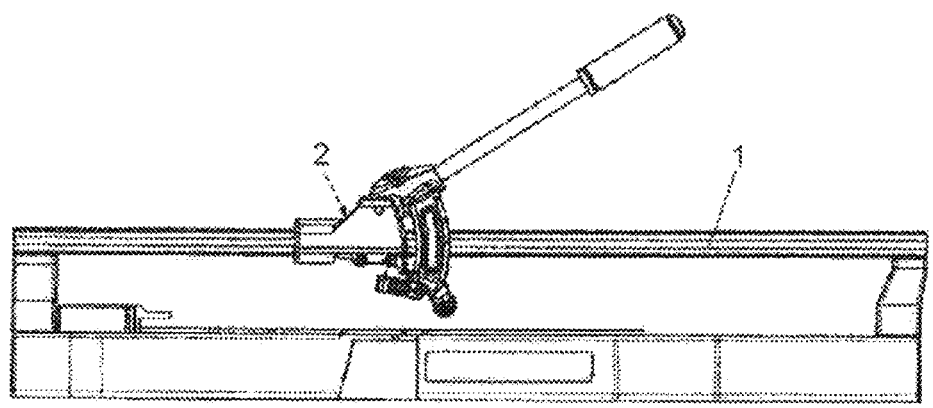
FIG. 1 shows a schematic perspective view of a manual ceramic cutter provided with a monoguide profile and of the self-adjusting device for the cutting head, according to the invention.

The exemplary embodiment shown in FIG. 1 shows a manual ceramic cutter provided with a monoguide (1) on which a cutting head (2) with the possibility of longitudinal movement is mounted.

Figure 2:
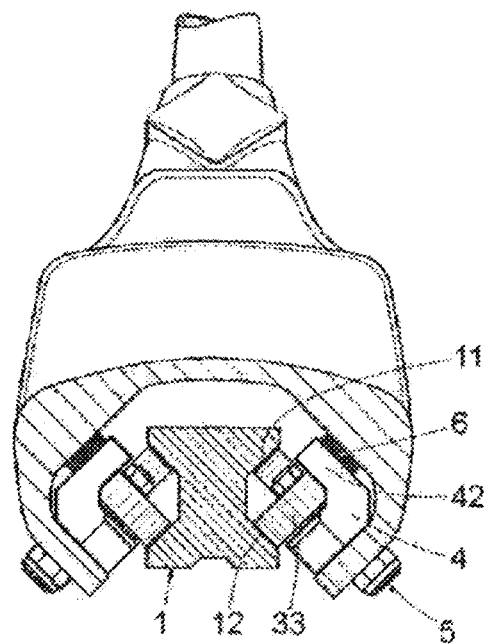
FIG. 2 shows a front detailed view of the cutting head and of the monoguide profile in a vertical plane cross section in which the self-adjusting device object of the invention can be seen.
Figure 3:
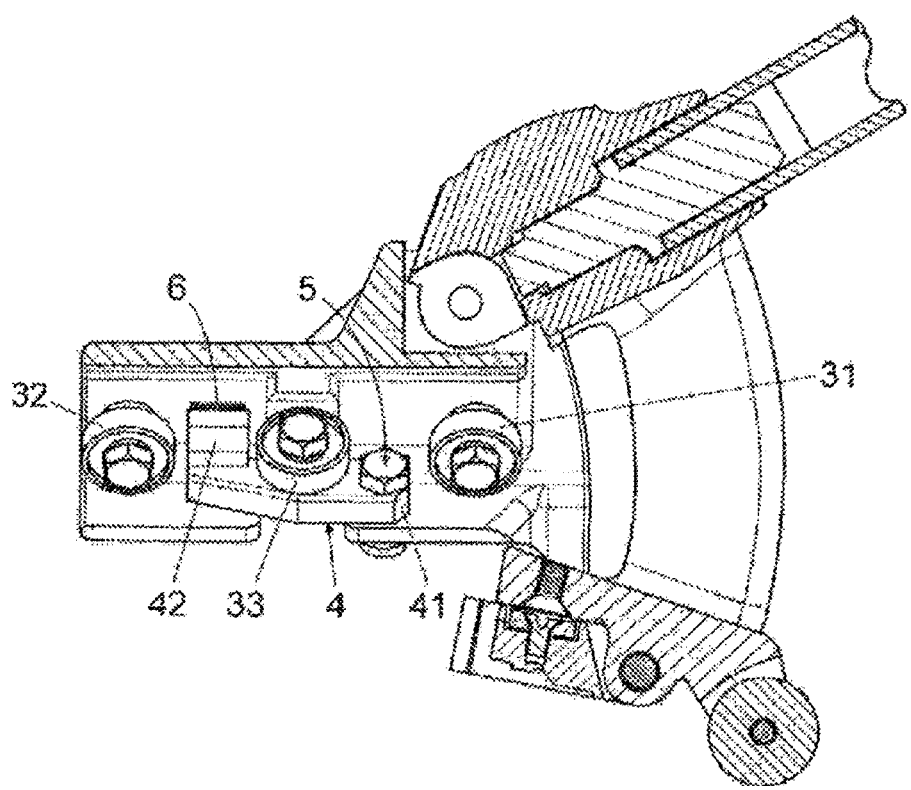
FIG. 3 shows a partial elevation view of the cutting head in a vertical plane cross section, showing one of the sets of bearings intended to act on one of the sides of the monoguide profile and making up the self-adjusting device of the invention.

As observed in FIGS. 2 and 3, the cutting head (2) comprises sets of bearings on the inside and on two opposite sides, each one of which comprises: a pair of fixed bearings (31, 32) longitudinally aligned and separated in the direction of movement of the cutting head (1) and an adjustable bearing (33) arranged between the two previous ones and on a plane that is perpendicular to the same.

The fixed bearings (31, 32) rest against a race (11) of the corresponding side of the guide profile (1), and the adjustable bearing (33) rests against a race (12) that is perpendicular to the previous one and corresponds to the same side of the guide profile (1).

Each adjustable bearing (33) is mounted on a rocker (4) having a first end (41) rotatably mounted on a shaft (5) fixed to the cutting head (1), and a second end (42) that presses against an elastic element (6) situated between said second end (42) of the rocker and the case of the cutting head (1).

The dimensions of the elastic element (6) and of the rocker (4) are calculated such that the adjustable bearing (33) exerts a specific pressure against the corresponding guide (12) of the monoguide profile (1) without any intervention or adjustment by the operator being necessary.

Having sufficiently described the nature of the invention, in addition to an example of preferred embodiment, it is hereby stated for the relevant purposes that the materials, shape, size and layout of the described elements may be modified, provided that it does not imply altering the essential characteristics of the invention claimed below.

The invention claimed is:

1. A device for monoguide cutters, comprising:
   a cutting head configured to move along a rail having a single profile, which includes two sets of bearings on opposite sides of the rail, each set of the two sets of bearings comprising two fixed bearings and one adjustable bearing;
   wherein the two fixed bearings are longitudinally aligned and separated in a direction of movement of the cutting head; and
   wherein the adjustable bearing is arranged between the two fixed bearings on a plane perpendicular to the two fixed bearings;
   wherein the two fixed bearings and the adjustable bearings act on longitudinal races defined on the rail and arranged on different planes; and
   wherein each of the adjustable bearings is mounted on a rocker arm which has a first end rotatably mounted on a shaft fixed to the cutting head, and a second end that presses against an elastic element situated between said second end of the rocker arm and a case of the cutting head, said elastic element determining a pressure of the adjustable bearings against the longitudinal races of the monoguide profile.

2. The device according to claim 1, wherein the the two sets of bearings are located on an inside of the cutting head.

* * * * *